(12) United States Patent
Peterson et al.

(10) Patent No.: US 12,504,747 B2
(45) Date of Patent: Dec. 23, 2025

(54) MULTICOMPONENT MODULE DESIGN AND FABRICATION

(71) Applicant: International Business Machines Corporation, Armonk, NY (US)

(72) Inventors: Kirk D. Peterson, Jericho, VT (US); Steven Paul Ostrander, Poughkeepsie, NY (US); Stephanie E Allard, St-Hyacinthe (CA); Charles L. Reynolds, Red Hook, NY (US); Sungjun Chun, Austin, TX (US); Daniel M. Dreps, Georgetown, TX (US); Brian W. Quinlan, Poughkeepsie, NY (US); Sylvain Pharand, St-Bruno-de-Montarville (CA); Jon Alfred Casey, Poughkeepsie, NY (US); David Edward Turnbull, Orford (CA); Pascale Gagnon, Brigham (CA); Jean Labonte, Cowansville (CA); Jean-Francois Bachand, Bromont (CA); Denis Blanchard, St-Alphonse de Granby (CA)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 17/209,574

(22) Filed: Mar. 23, 2021

(65) Prior Publication Data

US 2022/0308564 A1    Sep. 29, 2022

(51) Int. Cl.
 *G05B 19/418* (2006.01)

(52) U.S. Cl.
 CPC .......... *G05B 19/41875* (2013.01); *G05B 2219/32228* (2013.01); *G05B 2219/37224* (2013.01); *G05B 2219/45031* (2013.01)

(58) Field of Classification Search
 CPC .... G05B 19/41875; G05B 2219/32228; G05B 2219/37224; G05B 2219/45031
 See application file for complete search history.

(56) References Cited

U.S. PATENT DOCUMENTS

| 4,489,364 A | 12/1984 | Chance |
| 4,787,143 A | 11/1988 | Yagi et al. |

(Continued)

FOREIGN PATENT DOCUMENTS

| CN | 112247304 | * | 1/2021 |
| CN | 116917698 A | | 10/2023 |

(Continued)

OTHER PUBLICATIONS

International Application No. PCT/CN2022/075707 filed Feb. 9, 2022.

(Continued)

*Primary Examiner* — Thomas C Lee
*Assistant Examiner* — Anzuman Sharmin
(74) *Attorney, Agent, or Firm* — David K. Mattheis

(57) ABSTRACT

Multicomponent module assembly by identifying a failed site on a laminate comprising a plurality of sites, adding a machine discernible mark associated with the failed site, placing an electrically good element at a successful site; and providing an MCM comprising the laminate, and the electrically good element.

19 Claims, 6 Drawing Sheets

(56) References Cited

U.S. PATENT DOCUMENTS

| | | | |
|---|---|---|---|
| 5,570,274 A | 10/1996 | Saito | |
| 5,656,552 A | 8/1997 | Hudak | |
| 6,249,052 B1 | 6/2001 | Lin | |
| 6,316,822 B1 | 11/2001 | Venkateshwaran | |
| 6,395,566 B2 | 5/2002 | Farnworth | |
| 6,415,977 B1* | 7/2002 | Rumsey | H01L 23/544 |
| | | | 257/E23.179 |
| 6,549,024 B2 | 4/2003 | Mcallister | |
| 6,680,212 B2 | 1/2004 | Degani | |
| 6,983,536 B2 | 1/2006 | Farnworth | |
| 7,031,946 B1* | 4/2006 | Tamai | G06K 19/07758 |
| | | | 705/50 |
| 7,408,253 B2 | 8/2008 | Lin | |
| 7,561,938 B2* | 7/2009 | Akram | G03F 7/7065 |
| | | | 700/109 |
| 7,971,094 B1 | 6/2011 | Benn | |
| 8,081,079 B1* | 12/2011 | Camarota | G06K 19/07758 |
| | | | 340/572.1 |
| 8,290,239 B2* | 10/2012 | Noy | H05K 3/225 |
| | | | 382/141 |
| 2003/0038365 A1* | 2/2003 | Farnworth | H01L 24/83 |
| | | | 324/759.02 |
| 2003/0047805 A1 | 3/2003 | Farnworth | |
| 2003/0089977 A1 | 5/2003 | Chee | |
| 2004/0083018 A1* | 4/2004 | Dollevoet | B65H 39/16 |
| | | | 700/109 |
| 2005/0205642 A1* | 9/2005 | Kim | H05K 1/0266 |
| | | | 228/8 |
| 2007/0067125 A1* | 3/2007 | Guivarch | G06Q 10/08 |
| | | | 700/109 |
| 2007/0088451 A1 | 4/2007 | Akram et al. | |
| 2011/0071662 A1* | 3/2011 | Yokosawa | H01L 21/561 |
| | | | 700/121 |
| 2011/0233271 A1 | 9/2011 | Lin | |
| 2018/0269234 A1* | 9/2018 | Hughes | H01L 27/156 |
| 2020/0357706 A1* | 11/2020 | Gavagnin | H01L 22/14 |

FOREIGN PATENT DOCUMENTS

| | | | |
|---|---|---|---|
| DE | 112022000489 T5 | | 12/2023 |
| GB | 2619859 A | | 12/2023 |
| JP | 1027816 A | | 1/1998 |
| JP | 11118592 A | | 4/1999 |
| JP | 11-191577 A | | 7/1999 |
| JP | 2000020668 | * | 1/2000 |
| JP | 2004193189 A | * | 7/2004 |
| JP | 2011139083 A | | 7/2011 |
| JP | 2012094635 | * | 5/2012 |
| JP | 2012094635 A | * | 5/2012 |
| JP | 2014010602 A | | 1/2014 |
| JP | 2024-517544 A | | 4/2024 |
| WO | 2022199266 W | | 9/2022 |

OTHER PUBLICATIONS

International Search Report and Written Opinion dated Apr. 24, 2022 from International Application No. PCT/CN2022/075707.
Mell et al., "The NIST Definition of Cloud Computing", Recommendations of the National Institute of Standards and Technology, Special Publication 800-145, Sep. 2011, 7 pages.
Japan Patent Office, "Notice of Reasons for Refusal" Jun. 3, 2025, 06 Pages, JP Application No. 2023-553624.
Japan Patent Office, "Notice of Reasons for Refusal", Oct. 21, 2025, 06 Pages, JP Application No. 2023-553624.

* cited by examiner

MULTICOMPONENT MODULE DESIGN AND FABRICATION

BACKGROUND

The disclosure relates generally to the design and fabrication of multicomponent modules. The disclosure relates particularly to increasing fabrication process yield through design and assembly.

The complexity and physical sizing of multicomponent module (MCM) integrated circuits results in an increased number of device elements subject to failure and increases the module failure rate, reducing the yield from the manufacturing and assembly processes. Devices may be designed with redundant components to increase yield but simply adding redundant components adds complexity and cost without necessarily increasing output yields. MCMs may include a laminated substrate circuit board and a plurality of integrated circuit chips, components, or chiplets, assembled at specified locations upon the circuit board. MCM structural integrity, to prevent warpage etc., may require the presence of inserted chip, chiplet, or other surface mount elements at all defined sites.

Complex laminates include multiple alternating layers of conductive traces and non-conductive separator layers. Defects during fabrication in conductive traces may result in defective and unusable laminates. Such defective laminates may not be discovered until late in the fabrication and assembly process wasting resources, reducing process yields, and raising costs.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the fabrication and assembly of multicomponent module circuit elements.

Aspects of the invention disclose methods, systems and computer readable media associated with multicomponent module assembly by identifying a failed site on a laminate comprising a plurality of sites, adding a machine discernible mark associated with the failed site, placing an electrically good element at an unmarked site; and providing an MCM comprising the laminate, the failed site and the electrically good element. These steps yield a functional MCM without wasting electrically good components at failed component sites, and without wasting the entire assembly due to failed component sites.

Aspects of the invention disclose methods, systems and computer readable media associated with multicomponent module assembly by identifying a failed site on a laminate comprising a plurality of sites using an automated inspection, adding a machine discernible mark to differentiate the failed site from a successful site, placing an electrically good element at the successful site, and providing an MCM comprising the laminate, the mechanically good element and the electrically good element. These steps yield a functional MCM without wasting electrically good components at failed component sites, and without wasting the entire assembly due to a few failed component sites.

Aspects of the invention disclose methods, systems and computer readable media associated with multicomponent module assembly by identifying a failed site on a laminate comprising a plurality of sites using an automatic inspection, adding a machine discernible mark to differentiate the failed site, placing an electrically good element at a successful site, reading a first indicia associated with the laminate, updating a database entry associated with the first indicia according to the failed site, and providing an MCM comprising the laminate, the mechanically good element and the electrically good element. These steps yield a functional MCM without wasting electrically good components at failed component sites, and without wasting the entire assembly due to a few failed component sites. The steps further provide an updated and ongoing record of the fabrication process of the final assembly.

Aspects of the invention disclose methods, systems and computer readable media associated with multicomponent module assembly by identifying a failed site on a laminate comprising a plurality of sites using an automatic inspection, reading a first indicia associated with the laminate, updating a database entry associated with the first indicia according to the failed site, placing an electrically good element at a successful site according to the database entry, and providing an MCM comprising the laminate, the mechanically good element and the electrically good element. These steps yield a functional MCM without wasting electrically good components at failed component sites, and without wasting the entire assembly due to a few failed component sites. The steps further provide an updated and ongoing record of the fabrication process of the final assembly.

Aspects of the invention disclose a multicomponent module (MCM) assembly including a plurality of component sites, where at least one component site is a failed site, an electrically good element disposed upon a component site, where the component site is other than a failed site, and a mechanical only component or no component disposed upon the failed site.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
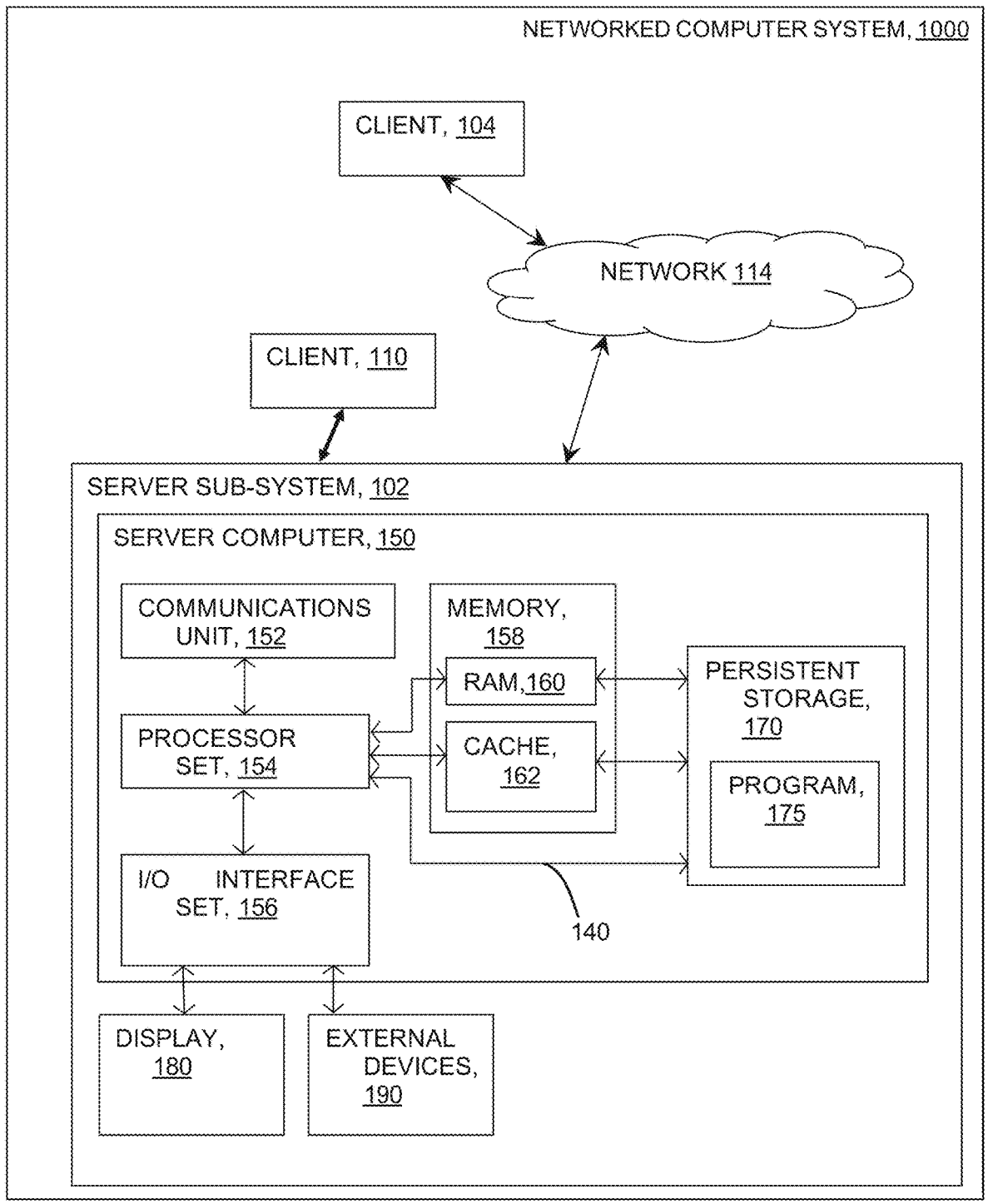
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

The complexity multi-layer laminated printed circuit boards, designed for large multicomponent modules, tends to drive up component costs due to low product yields arising from defects in one or more layers of the laminated boards. A single defect in a laminate layer may result in a rejection of the completely fabricated multicomponent module, raising overall per module costs by driving down product yield. Not all laminate defects need be fatal to the final product—not all defects need to result in a rejected assembly. Disclosed embodiments increase component yield by reducing the rejection rate due to a single or a small number of laminate defects. Rejects are reduced by identifying laminate defects as acceptable or unacceptable—with respect to module failure—and altering the downstream fabrication of the final component to accommodate the detected defects. Disclosed embodiments enable defect tracking through the assembly and packaging process to provide transparency as to the defects identified and accommodated in each final product.

In an embodiment, one or more components of the system can employ hardware and/or software to solve problems that are highly technical in nature (e.g., identifying a failed site on a laminate comprising a plurality of sites, adding a machine discernible mark associated with the failed site, placing a mechanically good element at the marked site, placing an electrically good element at an unmarked site; providing an MCM comprising the laminate, the mechanically good element and the electrically good element, etc.). These solutions are not abstract and cannot be performed as a set of mental acts by a human due to the processing capabilities needed to facilitate multicomponent module fabrication, for example. Further, some of the processes performed may be performed by a specialized computer for carrying out defined tasks related to MCM fabrication and assembly. For example, a specialized computer can be employed to carry out tasks related to fabricating multicomponent modules, or the like.

Disclosed embodiments may be practiced utilizing industrial automation systems including automated pick and place robotic systems and machine vision systems, as well as automated electrical testing systems to carry out steps associated with various embodiments. Subassemblies and laminates in progress—such as multi-layer laminates after each additional layer of conductive traces has been added, may be inspected optically, and/or electrically to identify potential or actual laminate trace defects. Over the course of fabrication of the multi-layer laminate, conductive trace defects may accumulate resulting in the identification of sufficient failed component sites to identify the laminate as failed—having insufficient successful component sites remaining to be successful. Such failed laminates are discarded from further fabrication steps, decreasing costs as no further resources are applied to the failed laminates.

Circuit board laminates, including alternating layers of non-conductive substrate and conductive traces, may develop defects during the laminate fabrication processes. Defects may arise from foreign material interfering with fabrication imaging processes associated with creating conductive traces for the signal lines, and via interconnects between component sites, and other conductive trace connections. Process excursions may cause dry film resin adhesion issues altering the structural integrity of the finished laminate from the intended design. Plating process defects may result in signal line and via interconnects being incompletely deposited upon the laminate surface. Surface contaminants may result in improperly formed traces. Indentations, or other imperfections in the underlying dielectric surface may also lead to laminate defects.

Rejecting laminates, or final assemblies, due to laminate defects reduces overall process yield and increases per unit costs. Disclosed embodiments enable the use of laminates and assemblies in spite of defects. Salvaging such functional laminates and assemblies increases overall yield rates and reduces costs per unit.

In an embodiment, the method for multicomponent assembly identifies laminate defects during the laminate fabrication processes. In this embodiment, the method inspects laminates at each step of formation, after the conductive traces of each layer of the overall laminate are created. The method may inspect the laminate traces using optical and/or electrical inspection methods. Optical methods include visible machine vision examination of the traces of a layer as well as infrared examination of the traces. Each of the visible or infrared inspection looks for improperly formed trace portions, incomplete traces, delaminated traces, etc. In this embodiment, the optical inspections compare current trace appearance data with expected trace appearances for each portion of the traces of each layer. Expected trace appearances may be gathered from "good" laminate fabrications, where good refers to well-formed races meeting the design criteria, The method may further utilize a database including images of previously detected "bad" trace portions, wherein bad refers to failed traces (incompletely formed, delaminated, contaminated, etc.) or traces otherwise not conforming to the design criteria in appearance. In an embodiment, the method utilizes a machine learning classification model to identify patterns of failed and successful board elements.

Electrical inspections include checking for electrical open and electrical shorts across the traces of each layer. The inspections use robotic actuated probes to check electrical resistance and continuity between defined contact points across the traces of each layer. Electrical opens—infinite resistance and no continuity—indicate that two contact points are electrically distinct, or parts of different electrical circuits. Electrical shorts—zero or low resistance and high continuity —indicate that the contact points are part of the same circuit. For any particular layer of traces, the traces define a pattern of electrical shorts and opens across the traces. The electrical inspection verifies the proper status at various contact point pairs—opens where there are designed opens, shorts where the design calls for shorts, etc.

In this embodiment, the inspection results identify failed trace portions upon each layer of traces of the laminate. Electrically failed trace portions include an open where there should be a short, and a short where there should be an open. Optical failed portions include trace portions showing incomplete traces, delaminated traces, or other trace portions having an unexpected appearance.

In an embodiment, the method designates laminate portions failing to meet design criteria according to either the optical or electrical inspection as failed sites. Failure of critical sites results in a rejection of the laminate while failure of non-critical portions of the laminate can result in a partial assembly capable of satisfying a lesser design criteria.

In an embodiment, the method defines one or more regions for each layer of the laminate. For each region the method defines acceptable and unacceptable criteria for the presence of portion defects/failed portions. The traces of each layer of the overall design relate to components installed upon the finished laminate in the assembly of the multicomponent module. The method associates the failed portions identified on each layer with the associated components of the final assembly, including the component installation site, including component mounting sites. For each region and component site, the method defines inspection criteria including acceptable and unacceptable trace portion defects. (Those defects rendering the component site "failed" and those rendering it still usable, or successful.) In this embodiment, the method conducts inspections of each defined region as set forth above and determines failed component sites according to the defined criteria for the regions. In an embodiment, the method receives user definitions for regions and for the acceptable and unacceptable inspection criteria for each region.

As the fabrication/assembly progresses, the method tracks the locations and identities of component and chiplet sites associated with no defective trace portions as well as those associated with particular defective and failed trace portions. In one embodiment, the method applies a discernible mark to differentiate those sites identified as failed due to underlying laminate defects including failed traces from successful and usable sites. The discernible mark may be applied using an inkjet or similar printer or may be applied to the laminate using a laser printer or similar marking device. The printed mark provides a site identifier discernible using machine vision systems to identify the marked site subsequent to the application of the discernible mark. In an embodiment, the method applies a mark to differentiate failed and successful sites. The mark may be applied to either the failed site or the successful sites. The mark may be applied to each site individually, or a single mark may be applied at a specified location with the respective portions of the single mark indicating success or failure for the respective component sites. The placement of mechanically good and electrically good components proceeds according to the marking, with mechanically good components placed at failed sites, and electrically good components placed at successful sites.

In an embodiment, the method maintains a database of site location associated with each MCM final assembly. In this embodiment, the method tracks the identification of failed sites and updates the database records for individual assemblies/laminates noting the locations of failed sites identified using the inspection methods noted above. As an example, a final assembly may include eight component sites, during fabrication, the method may identify failed traces associated with one component site of a laminate and update the database record for that laminate to indicate the failure of the identified component site due to the laminate defects.

In this embodiment, the method includes scanning each laminate to read a serialized indicium, such as a serialized one- or two-dimensional barcode, a serial number, or other serialized indicia applied to each individual laminate as part of the overall fabrication process. Scanning the serialized indicia enables the method to maintain and update individual records for each laminate of the fabrication process with some or all inspection and fabrication data.

In an embodiment, fabrication data regarding process parameter settings and measured parameter values are updated to the database record for each laminate and assembly across the fabrication process. Setting such as process temperatures, airflows, dwell times etc., are added to the database record for each laminate according to the scanned serialized indicium. The database record enables the tracking of issues across the assembly process such as the identification of a common failed site for a particular assembly. (Site six of eight fails at a higher rate than any other site of the eight.) or the correlation of fabrication failures with particular process parameter measurements and settings.

In an embodiment, the database record includes a series of binary bits, or other digitized data, each bit or data portion corresponding to a particular inspection point, processing parameter measurement, or other fabrication process data. In this embodiment, the final version of the database record associated with an individual assembly/laminate provides record portions of the overall assembly process if not of the entire process.

In an embodiment, the method adds the database record for an MCM assembly as part of a set of records, or a single record, associated with a system to which the MCM assembly is added. In this embodiment, the overall system carries the entire database entry for some or all system components, or an indicium providing a link or notice as to the location of the database records for system components.

In an embodiment, the method utilizes each of the discernible marks and the database records to track the locations of failed sites of the laminates as assembly progresses. In an embodiment, the method utilizes one or the other but not both the printed mark and the database of locations to track failed sites.

In an embodiment, as assembly processes reach the stage of component mounting, the method examines the laminate, searching for sites marked as failed, or for a mark associated with all sites and indicating failed sites. In an embodiment, the method scans the serialized indicium of the laminate and reviews the database record for the laminate to identify failed component sites. The method may use optical scanning of the laminate for discernible marks in cooperation with the serialized indicium scanning and database review to identify failed sites of each laminate prior to the placement of components upon the laminate.

In an embodiment, the method places mechanically good components at failed component sites using robotic pick-and-place systems or other component placement means. In this embodiment, mechanically good components refers to elements having the size, shape, and mounting components identical to the component specified by the design but lacking the full electrical performance of the component specified by the design. Such mechanically good components may be mounted by the placement means at failed sites upon the laminate without adding the cost of a complete, mechanically, and electrically good component. The electrically good—also referred to as mechanically and electrically good component, meets the full design criteria for the component in terms of mechanical size, shape and insertion components as well as including the required electrical components, VLSI system on a chip, or other integrated circuits, etc. In an embodiment, mechanically good components include failed electrical components having the correct physical size and shape required by the design criteria. In an embodiment, mechanical only elements include purpose built chiplets or other components lacking circuit elements but having the proper shape and size of the design criteria. In an embodiment, the method places electrically good components at component sites and places no components/chiplets at the failed site. In an embodiment, the method places chiplets or other components at sites with consideration for redundant sites as part of the laminate design. In this embodiment for individual laminates having no failed sites—all fabricated chiplet and component sites are good sites—the method places a required number of electrically good chiplets and components upon good sites and places mechanically good chiplets and components upon the remaining good sites, thereby reducing the overall cost of the final assembly by placing mechanically good rather than electrically good chiplets on the redundant chiplet sites. In an embodiment, the method places electrically good chiplets at all available sites providing redundant electrically good chiplets for use by the MCM user.

Components form a part of the overall structure of a multicomponent module final assembly. Omitting components from failed sites reduces costs but may compromise the structural integrity of the final assembly, leading to laminate or assembly warpage or other issues due to the absence of the physical component. In an embodiment, insertion of mechanically good components at failed sites reduces the cost of the final assembly by only inserting expensive components at functional sites, while maintaining the overall structural integrity of the final assembly by the placement of mechanically good components at failed sites, providing the structural integrity expected from the components in the design of the MCM assembly.

During assembly, the pick-and-place means places electrically good chiplets and components at sites indicated as good by either the absence of a discernible mark associated with a particular site, a lack of notation in the associated database record, or both. After placement of the mechanically good components at any failed sites, and the placement of electrically good components at usable sites, the fabrication process continues yielding a usable final MCM assembly. Full assemblies—those assemblies including electrically good chiplets at all sites, and partial assemblies are provided as the output of the MCM fabrication and assembly process of the disclosed embodiments. Full assemblies satisfy the design criteria for the full MCM assembly. Partial assemblies satisfy the design criteria for lesser assemblies.

In an embodiment, the method defines, or receives user defined, overall success criteria for the finished MCM assembly, criteria include the number of good and failed sites, the number and nature of identified defects etc. In this embodiment, the method utilizes defined acceptable and unacceptable criteria and identifies each completed final assembly as either acceptable or unacceptable according to the defined criteria. The method provides the acceptable final MCM assemblies as the output.

In an embodiment, the method completes final assembly and packaging of the MCM and adds a second discernible and serialized indicium upon an outer surface of the MCM packaging. This second indicium corresponds to the first serialized indicium and provides either a link to the database entry for the particular MCM, or incorporates the data from the database entry directly within the indicium itself, such as through the use of a two-dimensional bar code, or a direct printing of the binary or other data of the database entry upon the packaging using inkjet or laser printing as described above.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise fabrication and assembly program (not shown) together with sufficient computing resource (processor, memory, network communications hardware) to execute the program. Client devices 104 and 110 may include laminate inspection element, such as optical and electrical inspection elements, as well as robotic pick-and-place systems programmed to place chiplets and other components at designated sites upon the laminates. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the fabrication and assembly program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., fabrication and assembly program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
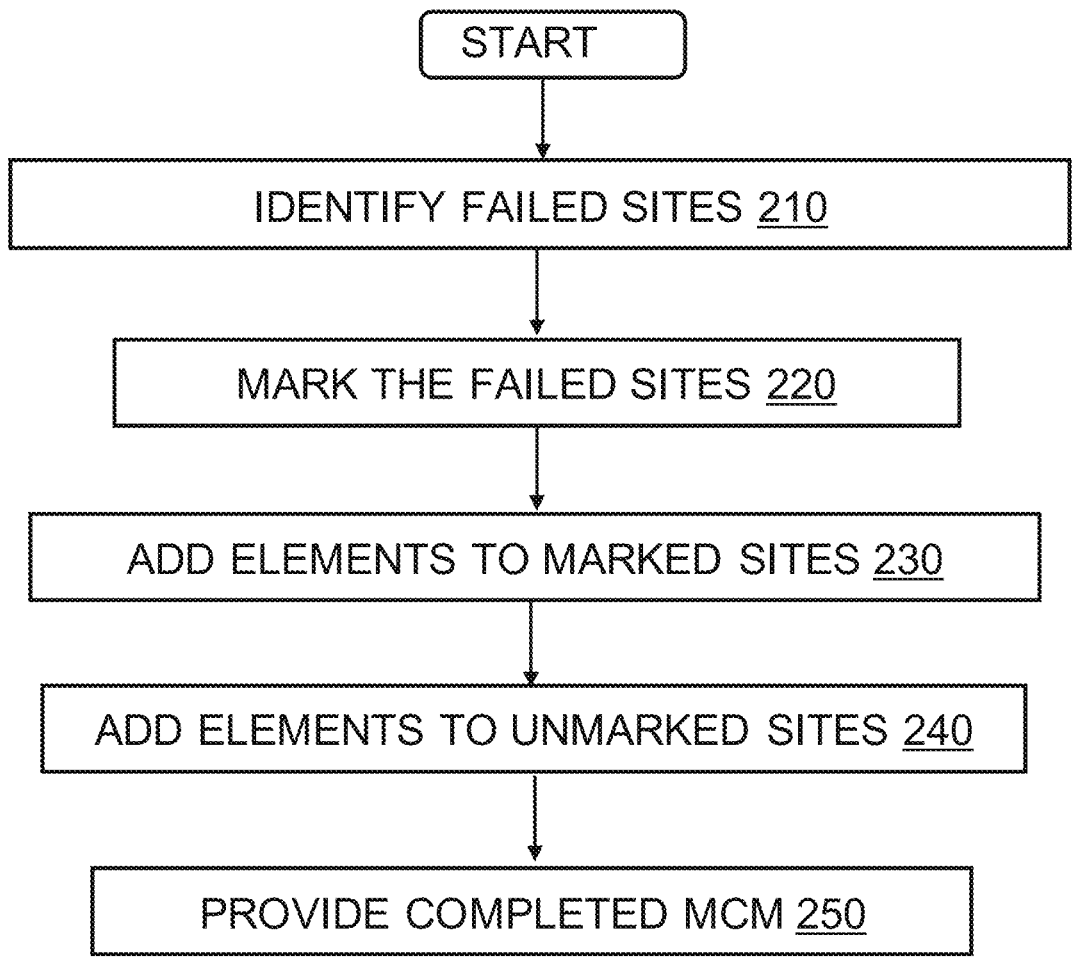
FIG. 2 provides a flowchart depicting an operational sequence, according to an embodiment of the invention.

FIG. 2 provides a flowchart 200, illustrating exemplary activities associated with the practice of the disclosure. After program start, at block 210, using a system as illustrated in FIG. 1 and described above, disclosed embodiments inspect laminates during the fabrication process to identify laminate conductive trace, and other assembly and fabrication defects. The inspection may include optical inspection, electrical inspection, and other non-destructive testing methods to identify trace portions which fail to meet design criteria for the laminate. For multi-layer laminates, the method inspects each layer of conductive traces, in one embodiment the method inspects each layer of conductive traces which are critical to the proper functioning of the chiplets after placement.

In an embodiment, the method evaluates inspection results against defined criteria for each portion of the laminate. In this embodiment, the method divides the laminate traces of each layer into regions and defines success/failure criteria for each region. As an example, some regions may be more tolerant of optically detected defects or specific electrically detected defects. As another example, some regions may include defects without impacting all chiplet sites. Failed trace portions in such regions may reduce the number of successful or electrically functional chiplet sites from an overall number of such sites, but the remaining number of successful sites may be above a threshold for a partially good but otherwise acceptable laminate for use in completing an MCM assembly. In an embodiment, success criteria include a threshold number of electrically good chiplet, and critical communication bus traces which must test successfully, etc. In an embodiment, the method receives and inspects boards according to user generated region-specific design definitions and inspection criteria, to identify failed and successful board sites.

In an embodiment, the method tracks available component sites according to the type of laminate undergoing inspection, as an example, each type of MCM may be built upon a different laminate model. For each such laminate model, the method looks up, and thereafter tracks, the component sites associated with that model of laminate for each individual instance of the laminate model undergoing inspection and assembly.

In an embodiment, the method compares electrical test results from the inspection to expected resistance and continuity values for the respective regions/portions of the laminate and determines if each portion passes or fails the inspection based upon that value comparison. In an embodiment, the method compares the optical inspection results using a machine vision system which compares the current optical data with expected optical patterns. In this embodiment, the method compares the current data to a range of acceptable optical patterns for each inspected portion of the laminate held in a database of images. In an embodiment, the method utilizes an artificial intelligence machine learning classification model, such as a convolutional neural network, a deep neural network, or a recurrent neural network, trained to identify image patterns corresponding to failed laminate portions. In this embodiment, training the model includes providing training and test data sets including images of previously identified failed laminate portions and having the model learn to recognize the image patterns associated with the failed portions. The method then provides new optical image data to the trained model for identification of failed portions of new laminates.

At block 220, the method working through the described computing system of FIG. 1, applies a discernible mark associated with sites of the laminate identified as failed from inspection data. In an embodiment, the method adds a single composite mark to a laminate indicating the status of all inspected sites as either failed or successful. In an embodiment, the method marks individual failed sites as failed, or marks successful sites as successful, or both. Marks discernible using machine vision systems, such as those described above, may be applied using inkjet printers, laser printers, or other suitable mark application systems.

At block 230, the method adds MCM assembly elements to the identified sites. The method adds elements such as mechanically good chiplet substitutes, having the shape, size, physical properties such as rigidity, and insertion components necessary for installation at the chiplet site, at the locations identified as failed. The substitute chiplets lack the electrical components of an electrically good chiplet and are much less expensive that the electrically good chiplet. Use of mechanically good chiplets/components provides any necessary mechanical properties expected from the presence of the chiplet, such as warpage control, while avoiding the use of expensive electrically good chiplets/ components at a non-functional site of the assembly. In an embodiment, the method scans the laminate, identifies the marked chiplet sites identified as either the good sites or the failed sites, and places the mechanically good chiplets/ components using robotically controlled pick- and place units, or a similar component placement system.

At block 240, the method adds electrically good components to the sites identified as acceptable, successful, or good, by the inspections. In an embodiment, the method marks good sites and leaves failed sites unchanged. In this embodiment, the method adds mechanically good components at unmarked sites and electrically good components at marked sites.

In an embodiment, the method scans a barcode or similar serialized indicium of the laminate and refers to the database entry or entries for that laminate. The database provides information regarding the locations of failed and good component sites and good and failed traces. The data enables the proper placement of mechanically and electrically good components at the respective component sites.

In an embodiment, the method updates the database entry, or entries, for the individual laminate with data regarding the placement of mechanically and electrically good components at respective component sites. Such updates provide an ongoing up to date history of the fabrication and assembly of the final MCM assemblies.

At block 250, the method completes the assembly of the MCM components, including external packaging of the MCM, and provides the finished MCM for use. In this embodiment, the method may apply an indicium to the outer MCM packaging indicating a serial number of the particular MCM unit, and/or providing data associated with the particular MCM unit. A provided serial number, or other serialized indicium enables a user to access stored database entries associated with the fabrication of the individual laminate and associated MCM assembly.

Figure 3:
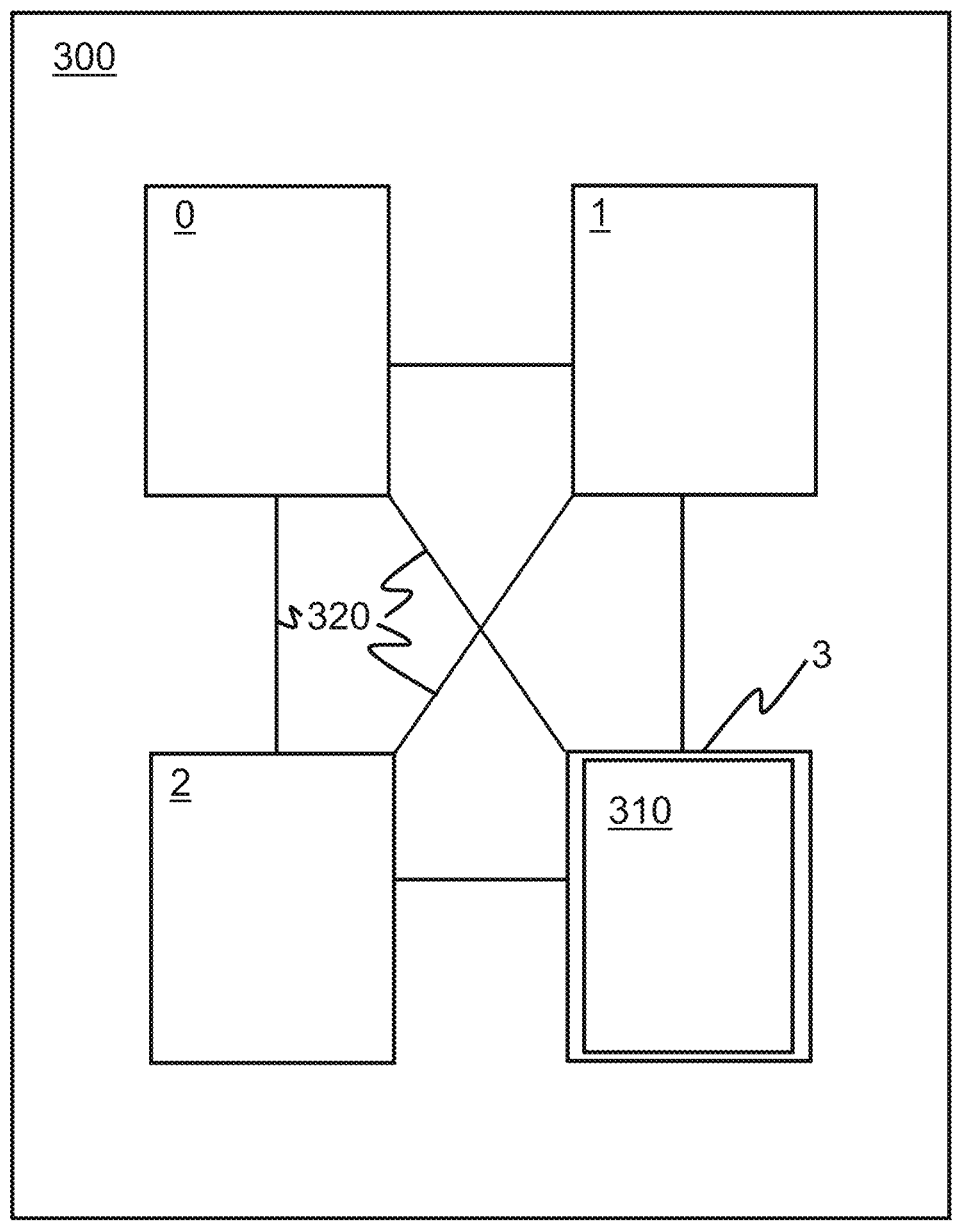
FIG. 3 provides a schematic illustration of a multicomponent module laminated printed circuit board, according to an embodiment of the invention.

FIG. 3 provides a schematic illustration of a laminate undergoing fabrication as part of the assembly of an MCM. As shown in the Figure, laminate 300, includes four chiplet sites items 0-3, electrically good chiplet 310, disposed at chiplet site 3, and a number of conductive traces 320 connecting chiplet and component sites to each other as well as to other assemblies by vias between laminate and laminate layers. During inspections, disclosed methods inspect each site and the conductive traces to identify trace defects and to identify failed sites and traces according to the design criteria and the defective traces. Each chiplet site, 0-3 may correspond to a defined region of laminate 300 for the purposes of inspection. Failed traces in each failed region may be associated with the corresponding chiplet or component site of that region. In an embodiment, conductive trace elements 320 include critical conductive traces. Critical conductive traces are required for functionality of any of the possible products. Detected failures for portions of critical trace elements result in a failed laminate regardless of the lack of other detected failed sites.

Figure 4:
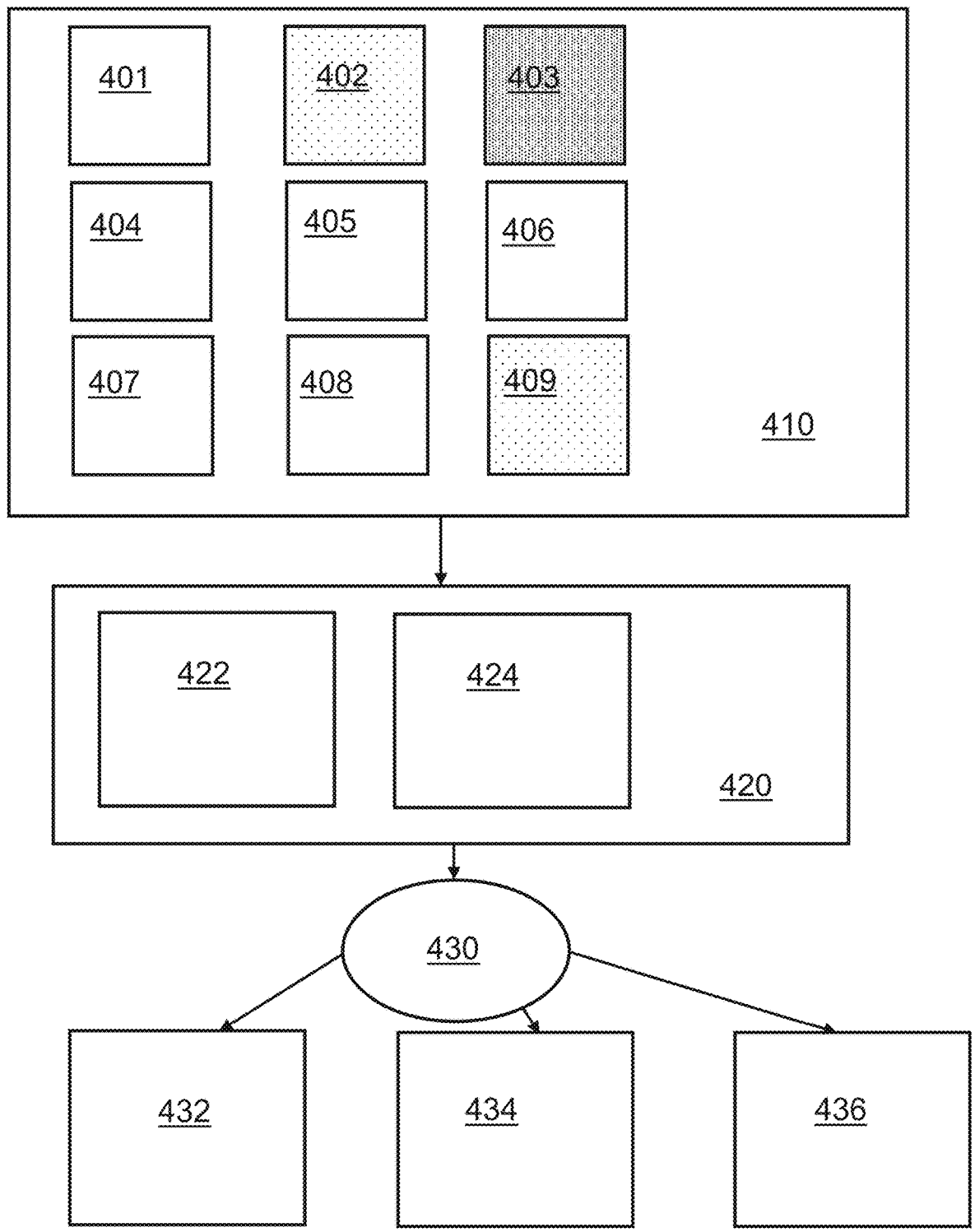
FIG. 4 depicts a schematic product flow, according to an embodiment of the invention.

FIG. 4 provides a schematic illustration of MCM assembly workflow, according to an embodiment of the invention. As shown in the figure, a set 410 of nine work-in-progress laminates, items 401-409, similar to laminate 300 of FIG. 3, are provided for optical inspection. Portions of laminates 402 and 409 fail the optical inspection yielding partially good laminates. Laminate 403 has sufficient optical inspection failures to be designated as a failed laminate and discarded or passed along for failure analysis, avoiding any costs associated with further processing of that laminate.

After the optical inspection, the method passes the lot 420, of remaining laminates, including good laminates 422, with no optical failures identified, and partially good laminates 424, with some optically identified failures, but enough redundant traces and component/chiplet sites remaining to be successful, on for electrical inspection 430. The results of the electrical inspection yield good laminates 432—no optical or electrical failed traces or sites, partially good laminates 434—a combination of optical and electrical failed sites and traces, but having sufficient redundant sites and traces to be successful, and failed laminates 436—having too few remaining redundant sites and/or traces after the optical and electrical inspections to satisfy the overall success criteria for the laminate and MCM assembly. The method passes good laminates, 432, and partially good laminates 434 on for use in larger assemblies. The method identifies failed laminates 436 as failed/rejected and passes them along for destruction or failure analysis.

Disclose embodiment increase process yield by utilizing partially good laminate structures rather than discarding all laminates having even a single site or trace failure. In an embodiment, the method analyses the fabrication process database entries to determine design elements of laminates and assemblies subject to higher or lower levels of failure. Such analysis enables design review and changes to the design and process to reduce such failures. In an embodiment, such analysis leads to design review and design changes to add additional redundant design components to reduce the effect of trace and site failures on overall laminate and assembly yields.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Embodiments of the invention use edge cloud and cloud resources to process laminate inspection data, hold inspection machine learning models, hold MCM assembly database records, and enable the access of MCM assembly database records by fabricators and downstream consumers of finished MCM assemblies.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
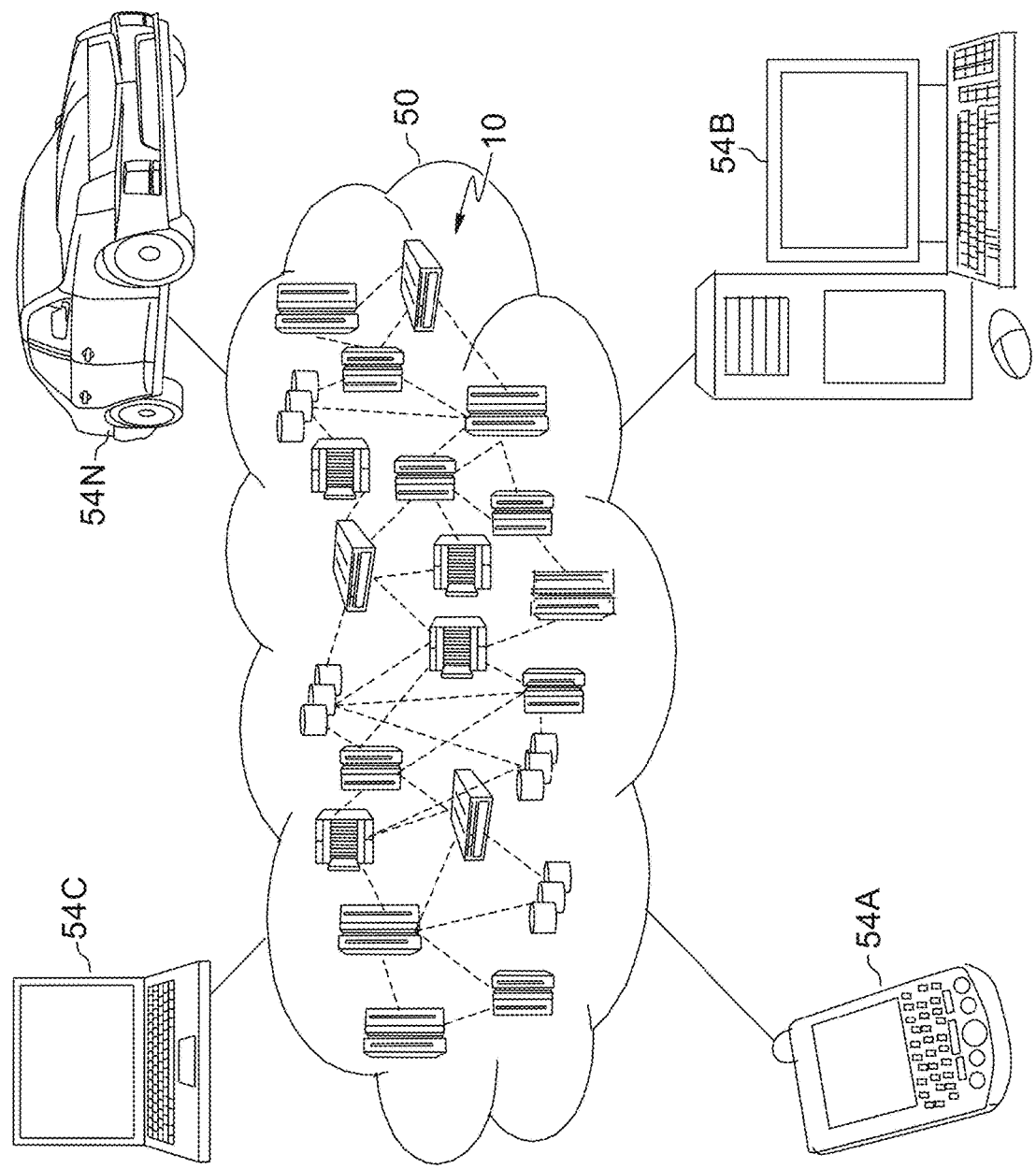
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
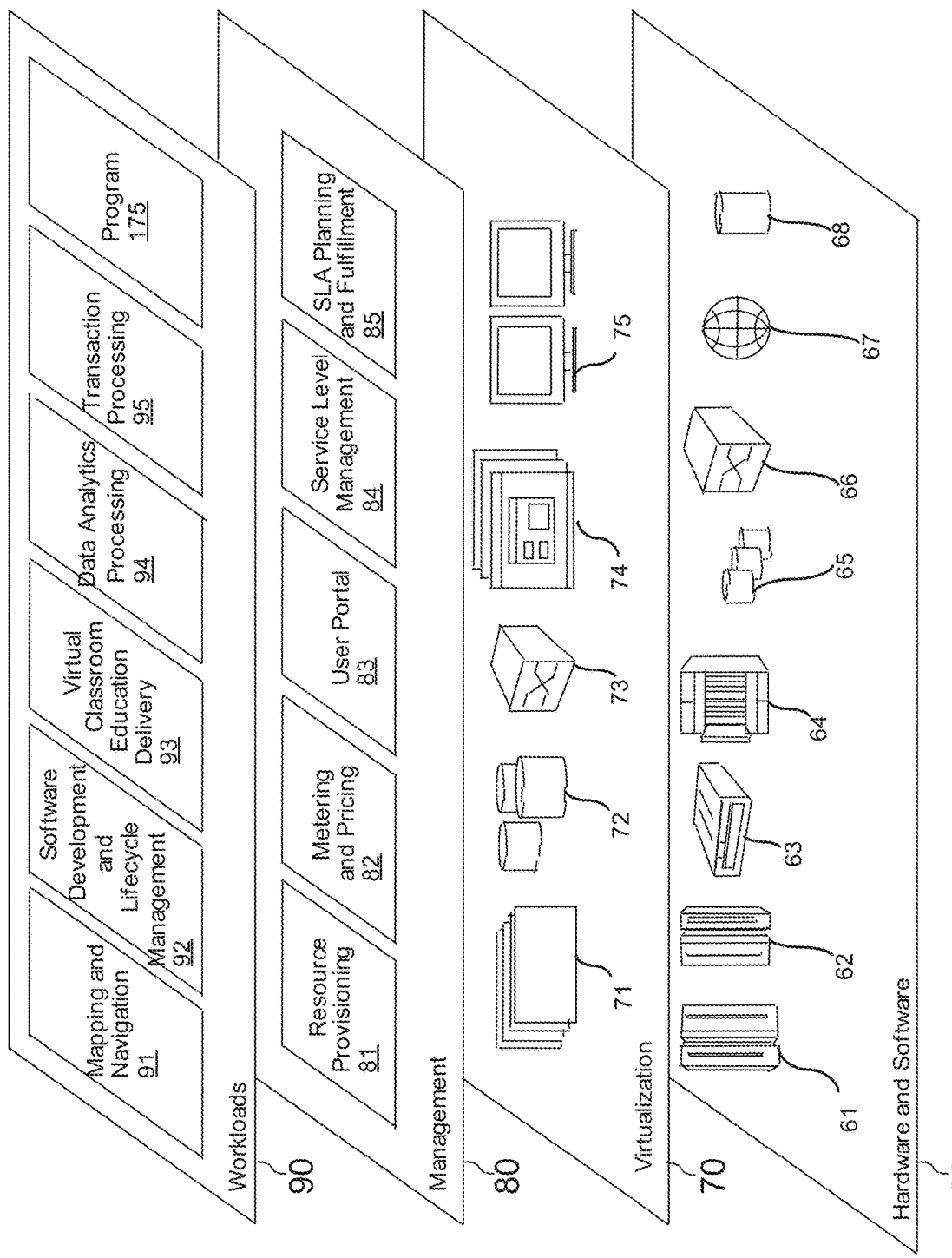
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and fabrication and assembly program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for multicomponent module assembly, the method comprising:
    identifying, by one or more computer processors, a failed site on a laminate comprising a plurality of sites;
    adding, a machine discernible mark associated with the failed site to the laminate;
    placing a mechanically good element at the failed site on the laminate according to the mark;
    placing, an electrically good element at a successful site on the laminate according to the mark;
    adding an external package to the laminate, the failed site and the successful site;
    adding an indicium to an outer surface of the external package, wherein the indicium provides access to mechanically good element location site data; and
    providing, a multicomponent module (MCM) comprising the package, the laminate, the failed site and the electrically good element.

2. The method according to claim 1, further comprising:
    receiving, by the one or more computer processors, a definition for at least one region for at least one layer of the laminate;
    receiving, by the one or more computer processors, inspection criteria for the at least one region;
    inspecting the at least one region according to the inspection criteria; and
    identifying a failed site according to the inspection.

3. The method according to claim 1, further comprising updating, by the one or more computer processors, a database entry associated with the laminate according to the failed site.

4. The method according to claim 1, further comprising receiving, by the one or more computer processors, an overall success criteria for the MCM; and accepting, by the one or more computer processors, the MCM according to the overall success criteria.

5. A method for multicomponent module (MCM) assembly, the method comprising:
    identifying, by one or more computer processors, a failed site on a laminate comprising a plurality of sites using an automated inspection;
    adding a machine discernible mark to differentiate the failed site from a successful site to the laminate;
    placing a mechanically good element at the failed site according to the mark;
    placing an electrically good element at the successful site of the laminate according to the mark; adding an external package to the laminate, the failed site and the successful site;
    adding an indicium to an outer surface of the external package, wherein the indicium provides access to mechanically good element location site data; and
    providing, a multicomponent module (MCM) comprising the package, the laminate, the failed site, and the electrically good element.

6. The method according to claim 5, further comprising:
    receiving, by the one or more computer processors, a definition for at least one region for at least one layer of the laminate;
    receiving, by the one or more computer processors, inspection criteria for the at least one region;
    inspecting, by the one or more computer processors, the at least one region according to the inspection criteria; and
    identifying, by the one or more computer processors, a failed site according to the inspection.

7. The method according to claim 5, further comprising updating, by the one or more computer processors, a database entry associated with the laminate according to the failed site.

8. The method according to claim 5, further comprising receiving, by the one or more computer processors, an overall success criteria for the MCM; and accepting, by the one or more computer processors, the MCM according to the overall success criteria.

9. A method for multicomponent module (MCM) assembly, the method comprising:
    identifying, by one or more computer processors, a failed site on a laminate comprising a plurality of sites using an automatic inspection;
    adding a machine discernible mark to differentiate the failed site to the laminate;
    placing a mechanically good element at the failed site according to the mark;
    placing an electrically good element at a successful site of the laminate according to the mark;
    reading a first indicia associated with the laminate;
    updating a database entry associated with the first indicia according to the failed site;
    adding an external package to the laminate, the failed site and the successful site;
    adding an indicium to an outer surface of the external package, wherein the indicium provides access to mechanically good site data; and
    providing, a multicomponent module (MCM) comprising the package, the laminate, the failed site and the electrically good element.

10. The method according to claim 9, further comprising:
    receiving, by the one or more computer processors, a definition for at least one region for at least one layer of the laminate;
    receiving, by the one or more computer processors, inspection criteria for the at least one region;
    inspecting, by the one or more computer processors, the at least one region according to the inspection criteria; and
    identifying, by the one or more computer processors, a failed site according to the inspection.

11. The method according to claim 9, further comprising receiving, by the one or more computer processors, an overall success criteria for the MCM; and accepting, by the one or more computer processors, the MCM according to the overall success criteria.

12. A method for multicomponent module assembly, the method comprising:
    identifying, by one or more computer processors, a failed site on a laminate comprising a plurality of sites using an automatic inspection;
    reading, by the one or more computer processors, a first indicia associated with the laminate;
    updating, by the one or more computer processors, a database entry associated with the first indicia according to the failed site;
    placing a mechanically good element at the failed site according to the database entry;

placing an electrically good element at a successful site on the laminate according to the database entry;

adding an external package to the laminate, the failed site and the successful site;

adding an indicium to an outer surface of the external package, wherein the indicium provides access to mechanically good element location site data; and providing, a multicomponent module (MCM) comprising the package, the laminate, and the electrically good element.

13. The method according to claim 12, further comprising:

receiving, by the one or more computer processors, a definition for at least one region for at least one layer of the laminate;

receiving, by the one or more computer processors, inspection criteria for the at least one region;

inspecting, by the one or more computer processors, the at least one region according to the inspection criteria; and identifying, by the one or more computer processors, the failed site according to the inspection.

14. The method according to claim 12, further comprising receiving, by the one or more computer processors, an overall success criteria for the MCM; and accepting, by the one or more computer processors, the MCM according to the overall success criteria.

15. A multicomponent module (MCM) assembly comprising:

a plurality of component sites, wherein at least one component site comprises a mechanically good element;

a machine discernable mark associated with the component sites;

an electrically good element disposed upon a component site, wherein the component site is other than the failed site;

an external package enclosing the plurality of component sites and comprising a second machine discernable mark associated with the mechanically good element site location data, disposed on an outer surface of the package; and a mechanically good component disposed upon the failed site.

16. The MCM assembly according to claim 15, further comprising:

a first serialized indicium disposed upon the MCM assembly.

17. The MCM assembly according to claim 15, further comprising a second indicium associated with the failed site, disposed upon the MCM assembly.

18. The MCM assembly according to claim 15, further comprising a third indicium associated with a database entry, disposed upon the MCM assembly.

19. The MCM assembly according to claim 15, further comprising a laminate defect associated with the failed site.

* * * * *